United States Patent [19]

Kaule et al.

[11] Patent Number: 4,756,557

[45] Date of Patent: Jul. 12, 1988

[54] SECURITY DOCUMENT HAVING A SECURITY THREAD EMBEDDED THEREIN AND METHODS FOR PRODUCING AND TESTING THE AUTHENTICITY OF THE SECURITY DOCUMENT

[75] Inventors: Wittich Kaule, Emmering; Gerhard Stenzel, Munich; Jürgen Moll, Grünwald; Gerhard Schwenk, Puchheim, all of Fed. Rep. of Germany

[73] Assignee: G.A.O. Gesellschaft fuer Automation und Organisation mbH, Fed. Rep. of Germany

[21] Appl. No.: 812,894

[22] Filed: Dec. 23, 1985

[30] Foreign Application Priority Data

Dec. 21, 1984 [DE] Fed. Rep. of Germany ....... 3446861

[51] Int. Cl.⁴ .............................................. B42D 15/00
[52] U.S. Cl. ..................................... 283/85; 283/904; 428/915
[58] Field of Search ............. 283/85, 904; 324/76 R; 427/7; 428/199, 913, 915, 916

[56] References Cited

U.S. PATENT DOCUMENTS

| 2,143,406 | 1/1939 | Chamberlain .................. 253/72 X |
| 3,728,521 | 4/1973 | Borough et al. . |
| 3,880,706 | 4/1975 | Williams . |
| 4,183,989 | 1/1980 | Tooth . |
| 4,265,703 | 5/1981 | Terliska . |
| 4,371,196 | 2/1983 | von Kempski et al. . |
| 4,524,276 | 6/1985 | Ohtombe . |
| 4,618,167 | 10/1986 | Whitehead ............................ 283/75 |

FOREIGN PATENT DOCUMENTS

| 0037507 | 3/1981 | European Pat. Off. . |
| 0092691 | 3/1983 | European Pat. Off. . |
| 677711 | 6/1939 | Fed. Rep. of Germany . |
| 1696245 | 1/1967 | Fed. Rep. of Germany . |
| 341970 | 6/1971 | Fed. Rep. of Germany . |
| 2156888 | 11/1971 | Fed. Rep. of Germany . |
| 7218681 | 3/1972 | Fed. Rep. of Germany . |
| 2148540 | 4/1972 | Fed. Rep. of Germany . |
| 2743019 | 9/1977 | Fed. Rep. of Germany . |
| 2754267 | 6/1978 | Fed. Rep. of Germany . |
| 2037755 | 8/1979 | Fed. Rep. of Germany . |
| 2919576 | 11/1979 | Fed. Rep. of Germany . |
| 84/00351 | 2/1984 | PCT Int'l Appl. . |
| 8242 | of 1839 | United Kingdom . |
| 1127043 | 1/1967 | United Kingdom . |
| 1326665 | 7/1971 | United Kingdom . |
| 1552853 | 9/1976 | United Kingdom . |

OTHER PUBLICATIONS

European Search Report.
"Synthesefasern", Bela von Kalfai, Verlag Chemie 1982, pp. 124–129.

Primary Examiner—Paul A. Bell
Attorney, Agent, or Firm—Robert J. Koch

[57] ABSTRACT

In order to increase the protection of security documents such as ban notes, etc., against forgery, security threads are embedded in the document which have at least two areas extending in the longitudinal direction of the thread and differing in their physical properties. The thread is preferably a coextruded multicomponent synthetic thread whose individual components contain additives such as dyes or fluorescent substances and/or particles having electrical or magnetic properties. The testing of the authenticity of the security thread is directed toward the presence of these additives and their mutual geometrical distribution in certain areas of the security thread.

28 Claims, 5 Drawing Sheets

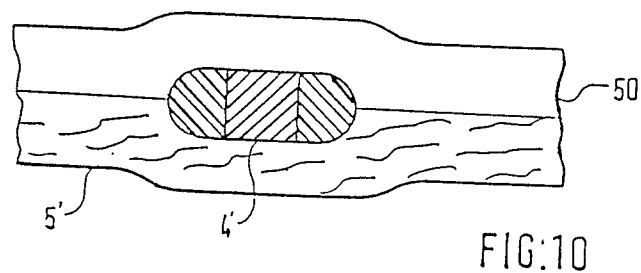

SECURITY DOCUMENT HAVING A SECURITY THREAD EMBEDDED THEREIN AND METHODS FOR PRODUCING AND TESTING THE AUTHENTICITY OF THE SECURITY DOCUMENT

BACKGROUND OF THE INVENTION

The present invention relates to a security document having a security thread embedded in the interior of the document, said thread being visually detectable in incident and transmitted light and having specific physical properties, and to methods for producing and testing the security document and the security thread.

It is known to prevent forgery by providing security documents such as money-value paper, identification cards, etc., with so-called "security threads". When a security document is being produced, these security threads are introduced into the interior of the sheet of paper during the sheet-forming process. The thread is usually embedded in such a way as to be completely surrounded by paper fibers (British Patent No. 8242 (1839), German utility model 72 18 681).

It is also known to prepare the security document or embed the thread in such a way that the thread is partially exposed and is thus directly visible or accessible at these places (German offenlegungsschrift No. 27 43 019). The specific optical properties of a security thread can be tested particularly well and easily when embedded in this manner.

German offenlegungsschrift No. 21 56 888 also discloses, among other things, the introduction of networks or individual threads made of thermoplastic material into security documents. Thermoplastic materials are used whose melting point is lower than 160° C. Since these temperatures are reached during the production of the paper, e.g. during drying, these thermoplasts melt, thereby reducing the networks into individual islands of thermoplastic material which are firmly connected with the paper substance.

In order to ascertain the authenticity of a security document provided with a security thread, the paper is usually tested as to the presence of the security thread and its position in the paper by regarding it in incident and transmitted light. Security threads which are glued on or painted on can be distinguished in this way very easily from genuine security threads introduced during the production of the paper.

In the case of forged security documents in which the security thread is glued in between two finished layers of paper, the visual impression may in fact correspond to that of a security document having a security thread introduced in situ. However, such a forgery can be easily distinguished from genuine bank notes due to the different properties of the paper (stiffness, resistance to separation, etc.) and the resulting difference in the "feel".

It is known to allow for security threads to be machine tested as well by using threads having specific physical properties on the basis of which the threads can be identified in appropriate testing apparatus. Such security threads are, for example, threads having specific magnetic, electric or fluorescent properties (German Patent No. 16 96 245, U.S. Pat. No. 2,143,406).

The testing of the known security documents having security threads is therefore usually directed to visual and/or machine testing in which it is ascertained whether a security thread is embedded at all and, possibly in a second step, whether this thread has the required physical properties.

Since security threads are by definition supposed to be localizable without using any devices and may be removed from the security document relatively easily, possibly destroying the latter, they are exposed to analysis attacks to a special degree. In order to counter forgery to a greater degree the security thread should therefore not only have a special physical property and be elaborately embedded in the paper but also, if possible, be of elaborate production itself and be difficult for a forger to recreate. But this requirement should not in any way impede the economical industrial production of such security threads.

SUMMARY OF THE INVENTION

The present invention is therefore based on the problem of providing a security document having a security thread which—although it can be produced economically and industrially in large quantities—can be tested not only in the usual way but also with respect to further threadspecific criteria, thereby making it extremely difficult for forgers to reconstruct it.

This problem is solved by a security document having a security thread embedded in the interior of the document, said thread being visually detectable in incident and transmitted light and having specific physical properties.

The invention is based on the idea of providing a security thread whose properties are firmly connected with the thread structure and production of the thread, so that a forger is forced, when attempting to reconstruct it, to resort to elaborate, specific production technologies for producing threads.

The inventive thread has, in a preferred embodiment, at least three stripes extending lengthwise on the thread and arranged exactly parallel to each other, which differ in terms of their physical behavior, for example their color, their fluorescent or their magnetic properties.

A document having such a security thread is therefore characterized by a high degree of protection against forgery since the areas on the security thread having the different physical properties are locally separated in a specific geometrical correspondence to each other. A forger is thus faced with essentially three obstacles since he must now imitate both the different physical properties and the exact geometrical correspondence of the features to each other and fulfil the necessary embedding in the paper.

Since the individual areas are located parallel to the surface of the document and can therefore be detected singly in a serial sequence by scanning one surface of the document, and the distance between the individual areas is an exact value which remains constant along the entire thread, not only the physical properties but also the width of the individual areas and the distances therebetween, for example, may now be used as test criteria to be detected by measurement techniques. By appropriately combining different test criteria which are based on the different properties and their exact geometrical correspondence, the additional effort required of a forger can be increased many times over while the additional effort expended on the test device remains reasonable.

Furthermore, it is consequently possible to design the coloring of the security thread in special ways, thereby influencing very substantially the visual appearance of a security document as well. For example, if such a security thread is provided in bank note paper with longitudinal stripes in the national colors, this bank note is given national marking not only by the printed pattern, but also by such characteristic coloring of the paper itself. The thread's characteristic coloring running exactly parallel to the edges also gives the bank note an esthetically attractive appearance.

The threads preferably used for the inventive security paper are synthetic threads manufactured by the coextrusion technique well-known in plastics processing. This technique allows for the manufacture of a single thread consisting of several components, the various components being located beside one another and the geometry of this structure remaining exactly constant along the entire length of the thread.

The various components are preferably made of the same synthetic material in order to prevent the thread manufactured in this way from curling.

The various components can be given specific physical properties by admixing additives. In accordance with the invention such additives may be dyes, fluorescent substances, particles having electrical or magnetic properties, etc.

The coextrusion technique is advantageous in that it allows for the manufacture of a single thread, as it were, although its volume is interspersed with various additives which give the thread specific colors, for example, and/or other physical properties. The additives to be introduced into the volume in appropriate concentrations are furthermore selectively associated with specific areas of the volume. Such a security thread can therefore always be distinguished unambiguously from threads with local coating, for example, both in terms of its geometric structure and in terms of the signal yield.

An alternative to the coextrusion technique consists in first producing separately extruded single threads having the specific physical properties and then joining them together before introducing them into the paper or the document. If all single threads are made of synthetic material they might also be firmly joined together in a special laminating apparatus under heat and pressure, provided the melting points of the synthetic materials do not vary too greatly.

The above-mentioned methods allow for the manufacture of extremely fine threads (fractions of a millimeter) having areas of a different physical nature which are separated in a locally exact manner and furthermore extend along the entire length of the thread in a firmly predetermined geometrical arrangement.

Due to the high precision and the possible fineness of the thread, it is not possible to manufacture it using simple means. A forger is therefore forced to apply the extrusion technique, which is expensive and requires much know-how, if he wants to reconstruct these threads. The attempt to reconstruct these threads may be further obstructed by not using any commercially available base materials or additives for the single threads of a composite thread or for the single components of a coextruded thread.

The inventive threads are preferably introduced into a document in such a way as to make them directly visible at least in part. In the case of money-value paper, the introduction of threads into the paper pulp may be controlled during manufacture, for example, in such a way that the thread is exposed intermittently on the surface of the finished sheet. A corresponding method is described in German Pat. No. 341 970. Other methods having the same objective are described in the German offenlegungsschrift No. 27 43 019 cited at the outset.

In the case of identification cards, which usually consist of several layers, the thread is preferably arranged under a transparent cover layer.

If the adjacent layers of the card are made of a material cognate with the synthetic material of the security thread, a homogeneous bond is obtained between the security thread and the adjacent layers during the laminating process.

Further advantages and advantageous developments are the object of the subclaims and of the following detailed description of the inventive subject with reference to the figures.

DETAILED DESCRIPTION OF THE DRAWINGS

Figure 1:
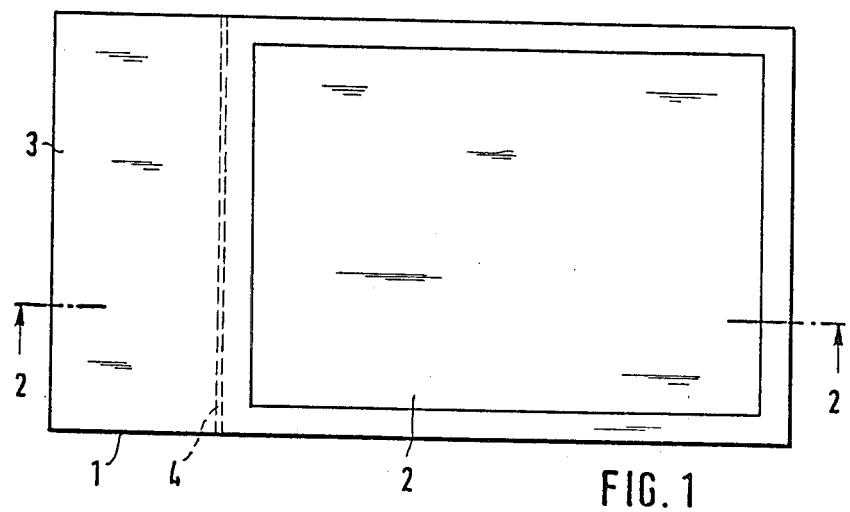
FIG. 1 an inventive document seen from the top

FIG. 1 shows a security document 1 in the form of a bank note having a printed area 2 and an unprinted so-called "white field" 3 which is usually provided with a watermark. A security thread 4 extending parallel to the shorter edge of the bank note is embedded in the interior of the document.

According to the invention, the security thread comprises a plurality of areas extending homogeneously along the entire length of the thread which differ in terms of their physical behavior.

Figure 2:
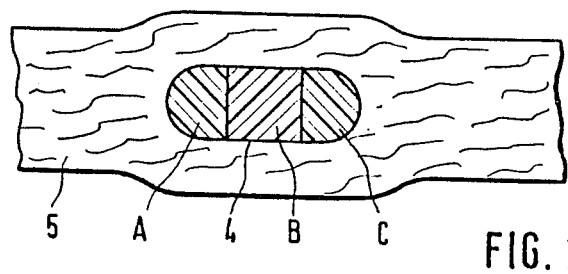
FIG. 2 a cross-section of the inventive document along line 2—2 of FIG. 1

FIG. 2 shows a possible cross-sectional form of a thread 4 embedded in a security paper 5 (cross-sectional line 2—2 of FIG. 1). The thread consists of three components A, B and C, which differ in terms of their physical properties, for example with respect to their spectral emission or transmission properties, fluorescent and/or magnetic properties. Components A, B and C are provided in the volume of the security thread, i.e. in a concentration which cannot be reconstructed by means of printing technology. They are arranged in a clearly and precisely defined correlation with one other in longitudinally parallel areas which are sharply delimited from one another.

Such threads may preferably be manufactured by the coextrusion technique well-known in plastics technology ("Synthesefasern", Bela von Kalfai, Verlag Chemie, 1982, pp. 124–126).

Figure 3:
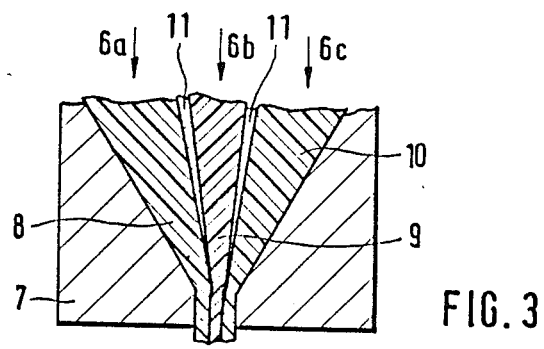
FIG. 3 an example of a coextrusion head

FIG. 3 schematically shows an extrusion head for producing a tricomponent thread shown in FIG. 2. Different synthetic materials 8, 9, 10, which are mixed with different additives and separated by partitions 11, are fed to extrusion head 7 via three channels 6a, b, c. The synthetic materials are present in a liquid state in the particular supply containers, heated to their respective melting points. Under the effect of pressure they are simultaneously pressed out of the various areas of the die and melted together in the contact area. The end product is a single thread having a rectangular or an oval cross-section, for example, depending on the profile of the basic die, and consisting in the present example of three different components arranged one beside the other.

Polymer partners which have the same melt viscosity at the temperature necessary for coextrusion and also have such a high affinity that the adhesion of the two cross-sectional halves is ensured without additional measures, are preferably used to manufacture bi- and multicomponent threads with a side-by-side arrangement. The fillers, coloring pigments, magnetic pigments, metallic pigments and/or soluble dyes are already mixed into the basic materials for such a thread in order to give the various components the desired physical properties. The multicomponent thread which then forms directly at the die head is consolidated by an appropriate drawdown of the thread from the die head and subsequent cooling to such an extent that there is no warping of the pattern and the components cannot run into each other. The drawdown is known to be dependent on the type of polymer, the extrusion temperature, the type of die geometry, etc., and may be set appropriately by varying these parameters accordingly.

The multicomponent thread may also be softened again subsequently by selective heating, or the cooling may be selectively interrupted at a specific stage, such that the thread may be deformed by calendering into other cross-sectional shapes, for example from an oval cross-section with a low thickness/width ratio into a flat band with an extreme thickness/width ratio.

A great number of possibilities of combination arise with respect to the structure and the form of the security thread. FIGS. 4a–e show some advantageous embodiments.

Figure 4:
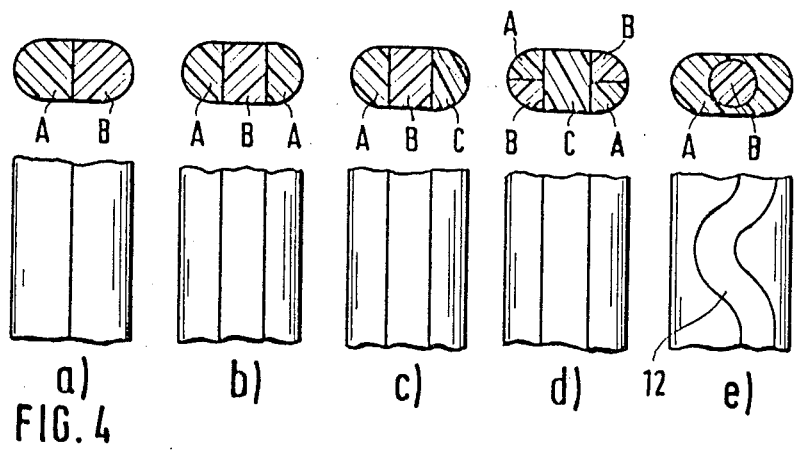
FIGS. 4a-e examples of various cross-sectional structures of inventive security threads FIG. 5 a laminating apparatus for manufacturing inventive security threads FIG. 6 a test device for detecting the authenticity of an inventive document FIG. 7 a diagram of the path of the test signal FIG. 8 a further advantageous embodiment of a test device FIG. 9 a test signal in the case of slanted position transport FIG. 10 schematically shows security thread 4, embedded in security document 5, and under transparent cover film 50.

FIG. 4a shows the cross-section of a bicomponent thread, for example. Components A and B are of different colors, have different magnetic or fluorescent properties.

FIG. 4b shows a tricomponent thread in which the edge stripes have the same physical properties. The center stripe is provided with a physical property which contrasts measurably with the edge stripes. Such an ABA coding may also be dyed, in addition to the properties detectable by measuring technology, in such a way that the areas are also easy to distinguish visually. The dyeing of the areas may coincide with the arrangement of the physical properties so that the coloring is color 1/color 2/color 1 in the case of an ABA coding, for example. However, the visually recognizable coloring need not necessarily coincide with the physical characterization. It is even particularly recommendable that they diverge when the physical properties cannot be tested visually themselves, as is the case with magnetic, electrically conductive, invisibly fluorescent properties, for example. A forger would assume that the same physical properties are involved with the same colors and reconstruct the thread accordingly.

FIG. 4c shows a tricomponent thread in which all three components differ in their physical behavior. Here too, it is possible to provide the various components with invisible properties, in addition to the coloring of the thread, in order to provide it with a further machine-testable coding.

FIG. 4d shows a thread whose outer components are composed of two layers, e.g. synthetic layers A and C of different colors. If component A is red, for example, component B is white and component C is yellow, the thread shows the color coding red-white-yellow or vice versa when regarded in incident light. When regarded in transmitted light, however, the color coding is orange-white-orange.

Finally, FIG. 4e shows a thread structure in which the inner component B has a circular cross-section. Component B flows into the extruder outlet via an annular die. It is possible here, as in the other examples as well, to design the influent die for the center component so as to be movable. If it performs a pendulum movement, for example, during the extrusion process, the inner component of security thread 12 describes a serpentine.

An alternative to the coextrusion technique consists in first producing a plurality of single threads and then combining them into a multicomponent thread. In this way as well, threads can be produced which have the above-mentioned properties with respect to their geometrical dimensions and different physical behavior, thus being suitable for the manufacture of an inventive security paper.

Extruded synthetic threads mixed, depending on the requirements, with specific fillers, color pigments, magnetic pigments, metallic pigments and/or soluble dyes, are again preferably used for the single threads. As in the case of the coextrusion technique, there is also a great number of possibilities here for combining the threads out of several differently prepared single threads. Structures as shown in FIGS. 4a–d are also possible using this production technique.

Figure 5:
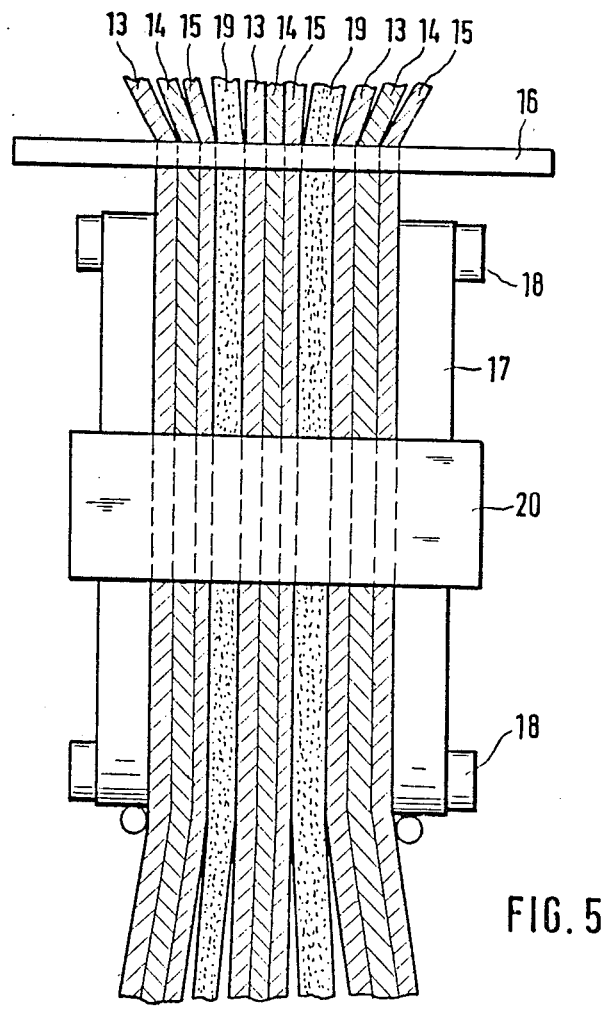

FIG. 5 shows an apparatus for simultaneously manufacturing several multicomponent threads consisting of different single threads.

The different-colored components of the security thread to be produced are manufactured separately by extrusion as single threads 13, 14 and 15 having a round or oval cross-section, and then wound onto spools. The threads are united into a band, which is multicolored, for example, in such a way that the single threads are drawn through guide rails 16 and fixed by a contact adhesive on a carrier film 17, an endless belt running across deflection rollers 18. It is important that the single threads run onto the carrier film parallel and are fixed thereon in contact. The single threads are joined to form a multi-colored band by lamination in an appropriate laminating device 20 at a high temperature, whereby the various sets of single threads located one beside the other are isolated from each other by dividing bands 19 having a much higher softening point than the multicomponent security threads to be manufactured. The carrier film must of course have the same thermal properties as the dividing bands. Security threads manufactured in this way can be removed from the carrier film after lamination and wound onto spools separately.

Synthetic materials having a high softening point and low affinity with the single threads used, such as TEFLON, HOSTAFAN, etc., are suitable for the carrier film and dividing bands. The threads are preferably made of polymers having a high affinity with each other and being characterized by a low softening point, such as copolymers on the basis of polyamides, acrylates and polyethylenes, for example.

If the single threads are made of non-laminatable materials it is possible to provide these threads, or at least the threads which later come to lie on the inside, with an adhesive layer and then join them together.

In the following, examples of possible different dopings of the various volume areas of tricomponent threads, for example, shall be given.

EXAMPLE 1

The polymer mixture, e.g. copolymerized polyamide "Akulon" of the Akzoplastiks Company, is distributed over three extruders and the granular material fused. Three percent by weight of europium-tris(dibenzoylmethane) is mixed into the melt of each component of the thread which is later on the outside, in such a way that it dissolves in the polyamide melt, thereby being distributed homogeneously therein.

After extrusion of the multicomponent threads, a security thread is obtained whose two edge stripes fluoresce red when excited by UV light, while the center stripe does not show any fluorescence. Furthermore, the various segments of the thread may be colored by visible dyes or pigments, whereby it must only be ensured that the dye used is transparent in the range of the fluorescence emission line.

EXAMPLE 2

One proceeds as described in Example 1, except that in this case two segments of the thread are provided with different feature substances. As the first coding, 3% of Nile blue of the oxazin dye series (Eastman company, Flukka) is used, for example, and as the second coding component Lumilux CDEK80/24 of the Riedel de Haen company in a concentration of 4%.

A thread is thus obtained, for example, whose two edge stripes show different fluorescences, depending on how they are excited. When excited by visible light Nile blue causes fluorescence in the very near infrared region, while excitation in the UV range causes green fluorescence in the second coding component.

EXAMPLE 3

One proceeds as described in Example 1, except that in this case all three segments of the thread are given a coding.

The two edge stripes are mixed, analogously to Example 1, with one percent by weight of europium-tris(-thenoyltrifluoroacetone) and the center stripe with five percent by weight of Lumogen light yellow LT (BASF). After extrusion a thread is obtained which shows strong yellow fluorescence along its entire width when exposed to UV light. The red fluorescence of the two edge stripes is not perceived by the human eye but can be detected by an appropriate sensor.

EXAMPLE 4

One proceeds as described in Example 1, except that five percent by weight of magnetic pigment no. 8200 of Bayer is used instead of the admixed europium compound, being added to the polymer mixtures which feed the two outer extrusion dies.

A multicomponent thread is thus obtained whose outer edge stripes are magnetic. In addition to the magnetic coding, the individual thread segments may here too be colored by visible dyes or pigments.

It is also possible, in addition to the examples stated, to dope the edge stripes of a tricomponent thread with a fluorescent substance showing, when excited by UV, emission in the visible range which lies precisely in the excitation spectrum of the fluorescent substances in the center stripe although its emission is measurable in the IR range, for example. During testing, one must take care that all extraneous light which might contribute to exciting the center stripe is avoided, except for the UV light required to excite the fluorescence, so that the center area of the security thread is only exposed to light produced by the edge stripes. Fluorescence emission in the center stripe can only be excited by the edge stripes in such a test, which is confirmation of the required composition of substances or the desired fluorescence properties in the security thread.

Good optical coupling is necessary between the various components for the mutual fluorescence excitation described, since the fluorescence emission of the first substance required to excite the second fluorescent substance is usually very slight.

Coextruded threads are characterized by very good optical coupling between the various components due to their homogeneous bond without any additional binding agents, so that precisely these threads are very suitable for realizing the above-stated examples. In the case of security threads manufactured in a different way this homogeneous coupling is lacking, so that the expected success is not achieved even if the right luminophores are used.

The inventive security document (bank note, identification card, etc.) may be tested as to its authenticity or originality in many ways with respect to the security thread, as suggested above.

Figure 6:
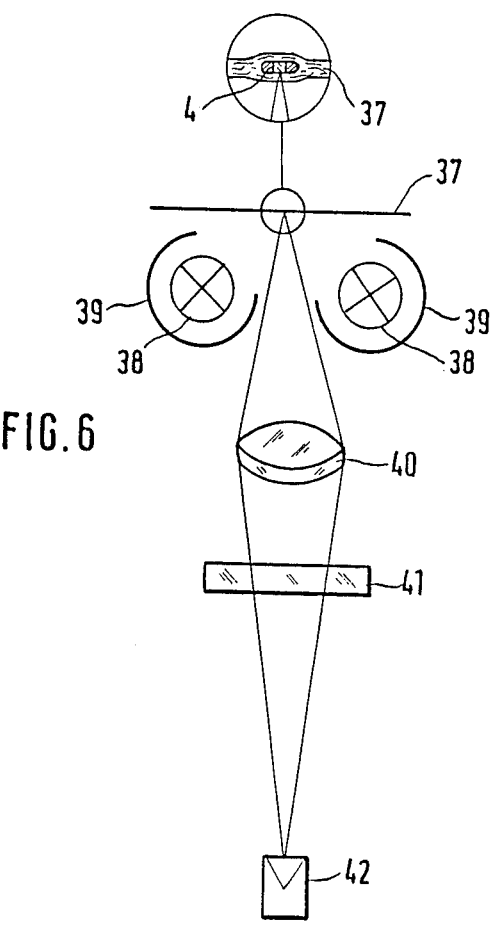

FIG. 6 shows in a schematic form a preferred embodiment of a test device for testing the thread described in Example 1. In accordance with Example 1, it is a tricomponent thread whose edge stripes contain europium-activated chelates and whose center zone is not active.

The document 37 (bank note) containing security thread 4, which is directed past the test device at a constant speed, is exposed to the light of two tubular UV lamps 38 having black-glass bulbs (e.g. Sylvania F4T5BLB), the activated zones of the security thread being excited to luminesce. Reflectors 39 serve the purpose of amplifying the excited intensity of radiation and shielding the lamp radiation from further components 40–42.

The specimen plane is reproduced onto a stripe-shaped silicon cell 42 about 1 mm wide (e.g. Hamamatsu S875-16R) by a lens 40 (e.g. Spindler & Hoyer; f=20 mm, $\phi$10 mm) enlarged in a ratio of 1:10. Thus, the detection system has a resolution of about 0.1 mm in the running direction of the specimen.

The luminescence radiation of the security thread falls through a narrow-band optical filter (interference filter) 41. With its pass band of 605 nm to 625 nm and a blocking of the spectral edge ranges from 200 nm to 1200 nm, the sensitivity of the optical arrangement is restricted to the narrow range of the europium emission line, so that the sensitivity to ambient light is eliminated to a large extent.

Figure 7:
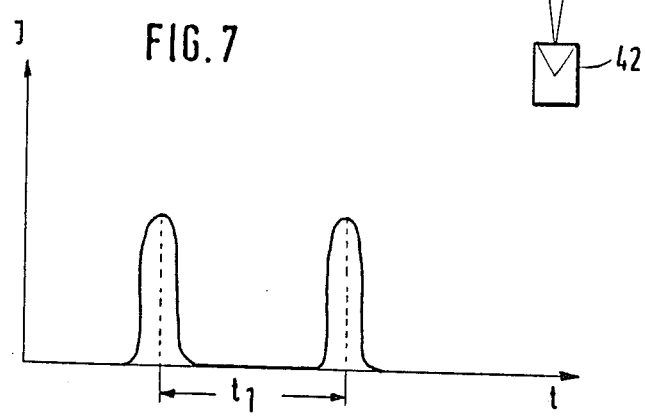

FIG. 7 shows the chronological path of this emission intensity received in sensor 42. Using photodetector 42, the emission occurring during passage through the test device for a security thread which is 0.8 mm wide, for example, and its 0.2 mm wide edge zones (europium chelate) is detected. The chronological distance $t_1$ between the two peaks is 0.6 mm divided by the running speed of the bank note.

Thus, both the specific physical (fluorescent) properties and the selective local presence of these properties in certain areas and the distance between these areas serve as values for detecting the authenticity of the security threads.

For testing the embodiments shown in Examples 2 and 3 the excitation light source or the detector optics must be adapted to the special fluorescence properties in each particular case.

For testing the magnetic security thread described in Example 4, the document first runs through a magnetizing unit and is then directed past a magnetic head. This magnetic head, which has a structure similar to that of a sound tape magnetic head, has a gap width of about 0.05 mm. A higher signal is obtained by such a magnetic head than by original sound heads having a gap ten times smaller.

A document having the embedded security thread is transported past the magnetic head preferably in contact. The distance of the security thread from the magnetic head due to the security thread being embedded in paper should not exceed a distance of 0.1 mm. The signals generated by the edge zones provided with magnetic pigment of the inventive security thread are evaluated analogously to the previous example.

Figure 8:
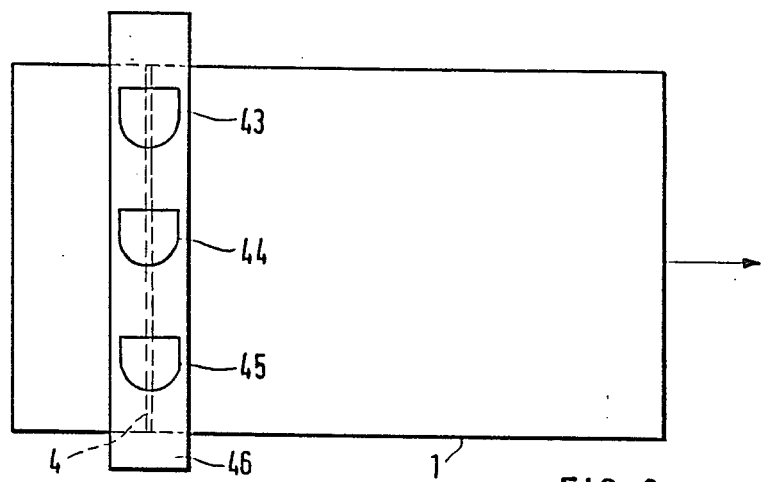

The test devices preferably contain a plurality of sensor heads located on a line with the security thread to be tested, as indicated in FIG. 8. These sensor heads 43-45 are arranged on a common carrier 46 which is attached perpendicularly to the running direction of the bank (arrow). It can thus be ascertained in connection with the detection of the position of the banknote using appropriate position sensors whether the security thread runs exactly parallel to the short edges of the bank note within the bank note, for in this case all output signals appear at the same time.

Figure 9:
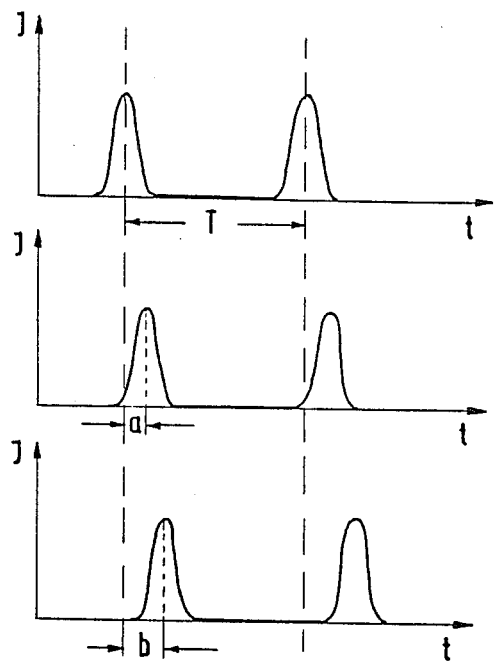

When the bank note is transported in a slanted position, the output signals of the various sensors appear with a time shift (FIG. 9). A falsified distance measurement resulting from this—the chronological distance T between the test signals is larger, so that the geometrical distance detected therefrom is also larger—may be corrected by correlating the measured distance value with the data a, b of the time shift.

A test device suitable for testing a security thread whose components have different physical properties contains a plurality of sensor heads adapted to the different properties, the number of these heads being at least equal to the number of components.

Each of these sensors is designed to detect a specific property. If the sensors lie on a line with the security thread passing through, the output signals of the sensors must appear at different, but predetermined, times. The evaluation of the chronological appearance of the different signals allows for the structure, the positions of the different components and their distance from each other to be determined.

If a tricomponent security thread is to be tested, for example, whose edge areas fluoresce red but whose center area fluoresces yellow as in Example 5, it is advantageous, for example, to coordinate the sensors 43 and 45 shown in FIG. 8 to detect the red fluorescence while sensor 44 detects the yellow fluorescence. In addition to the abovementioned distance measurement between the edge stripes, the specific fluorescence of the center stripe can thus also be tested.

If the fluorescent substances in the center stripe and the edge stripes differ only in their decay times, these times may be tested by laterally displacing certain sensors in the running direction of the bank note. For example, a luminophore having a short decay time is selected for the center stripe, but a luminophore having a long decay time for the edge stripes. In the test device as in FIG. 8 sensors 43 and 45 are then displaced laterally in such a way that the emission of the center stripe has already decayed when the security thread is transported past these sensors. Sensor 44 then provides a signal which is a measure of the entire width of the security thread, while sensors 43 and 45 provide the signal shown in FIG. 7 from which the distance between the edge stripes or the width of the center stripe can be determined.

In a test or sorter device for the inventive documents, two or more test devices as in FIG. 8 may also be used, for example, one device being designed to detect the visual design, for example, the coloring, of the thread while the other is directed to the presence of non-visible physical properties of the various areas of the security thread.

The multicomponent threads which are coextruded or composed of single threads may possibly be used in many ways in security documents after additional processing (coating, vaporizing, printing, etc.). Since the various components of the inventive security thread are preferably of different colors, it is advantageous to embed the thread in such a way that it is directly visible at least in part. The security threads may then be introduced into the security paper by the methods described in German patent no. 341 870 or German Patent No. 274 319.

In the case of identification cards, which usually consist of a plurality of synthetic layers, it is advisable to embed the thread under a transparent cover layer so that it is completely visible along its entire length. Synthetic materials are preferably used for the security thread whose softening points are higher than those of the card layer materials. The card layers may then be melted together using heat and pressure in the customary way, without damaging the security thread.

Without impairing the inventive properties of the security thread, the materials and the laminating process may be coordinated with each other in such a way that the thread is only softened in the surface area during the laminating process, so that a firm bond is obtained between the thread and the adjacent synthetic layers.

To increase the protection of synthetic cards against forgery, it is known to introduce a security paper inlay of high security value into these cards. Using the inventive security paper having an embedded multicomponent thread, the protection against forgery of this arrangement as well can be increased even further.

We claim:

1. A security document comprising at least one elongated security thread said security thread being at least partially embedded within said document, said thread being visually detectable in incident and/or transmitted light said security thread further comprising a plurality of areas extending homogeneously along the entire length of the thread, said areas differing in terms of their detectable physical properties and being arranged so that said detectable physical properties can be visually detected from a surface of said document.

2. The security document as in claim 1, wherein said areas have different spectral remitting/transmitting properties.

3. The security document as in claim 2, wherein said security thread further comprises three areas extending continuously in the longitudinal direction of said thread; wherein said areas are arranged as a center area and outer areas, said outer areas having at least one physical property differing from said center area.

4. The security document as in claim 3, wherein said outer areas have the same physical property.

5. The security document as in claim 1, wherein said areas have different fluorescence properties.

6. The security document as in claim 5, wherein said security thread further comprises three areas extending continuously in the longitudinal direction of said thread; wherein said areas are arranged as a center area and outer areas, said outer areas having at least one physical property differing from said center area.

7. The security document as in claim 6, wherein said outer areas have the same physical property.

8. The security document as in claim 4 wherein said areas are adjacent and comprise fluorescent substances such that emitted light of fluorescent substance of one area excites the fluorescent substance of an adjacent area to emit.

9. The security document as in claim 8, wherein said security thread further comprises three areas extending continuously in the longitudinal direction of said thread; wherein said areas are arranged as a center area and outer areas, said outer areas having at least one physical property differing from said center area.

10. The security document as in claim 9, wherein said outer areas have the same physical property.

11. The security document as in claim 1, wherein said areas further comprises different magnetic and/or electric properties.

12. The security document as in claim 11 wherein said security thread further comprises three areas extending continuously in the longitudinal direction of said thread; wherein said areas are arranged as a center area and outer areas, said outer areas having at least one physical property differing from said center area.

13. The security document as in claim 12, wherein said outer areas have the same physical property.

14. The security document as in claim 1, wherein said areas differ visibly and exhibit differing physical properties which are not detectable visually.

15. The security document as in claim 14, wherein said security thread further comprises three areas extending continuously in the longitudinal direction of said thread; wherein said areas are arranged as a center area and outer areas, said outer areas having at least one physical property differing from said center area.

16. The security document as in claim 15, wherein said outer areas have the same physical property.

17. The security document as in claim 1, wherein said security thread is a multicomponent synthetic thread manufactured using a coextrusion technique.

18. The security document as in claim 17, wherein individual components of the multicomponent synthetic thread are made of a polymer or polymer mixture either of which is provided with different additives conveying specific physical properties.

19. The security document as in claim 1, wherein said security thread further comprises a plurality of firmly interconnected single threads.

20. The security document as in claim 19, wherein said single threads are extruded synthetic threads.

21. The security document as in claim 19, wherein individual components of the multicomponent synthetic thread are made of a polymer or polymer mixture either of which is provided with different additives conveying specific physical properties.

22. The security document as in claim 1, wherein said security thread lies partly on a surface of said security document.

23. The security document as in claim 1, wherein said security thread is embedded in said security document under a transparent cover film.

24. The security document as in claim 1, wherein said security thread further comprises three areas extending continuously in the longitudinal direction of said thread; wherein said areas are arranged as a center area and outer areas, said outer areas having at least one physical property differing from said center area.

25. The security document as in claim 24, wherein said outer areas have the same physical property.

26. The security document as in claim 1, wherein the security thread is introduced into the document in such a way as to be directly visible at least in part.

27. The security document as in claim 26, wherein said security thread lies partly on a surface of the security document.

28. The security document as in claim 26, wherein said security thread is embedded in the security document under a transparent cover film.

* * * * *